E. J. TAYLOR.
GATE LATCH.
APPLICATION FILED JULY 6, 1914.
1,138,026.
Patented May 4, 1915.
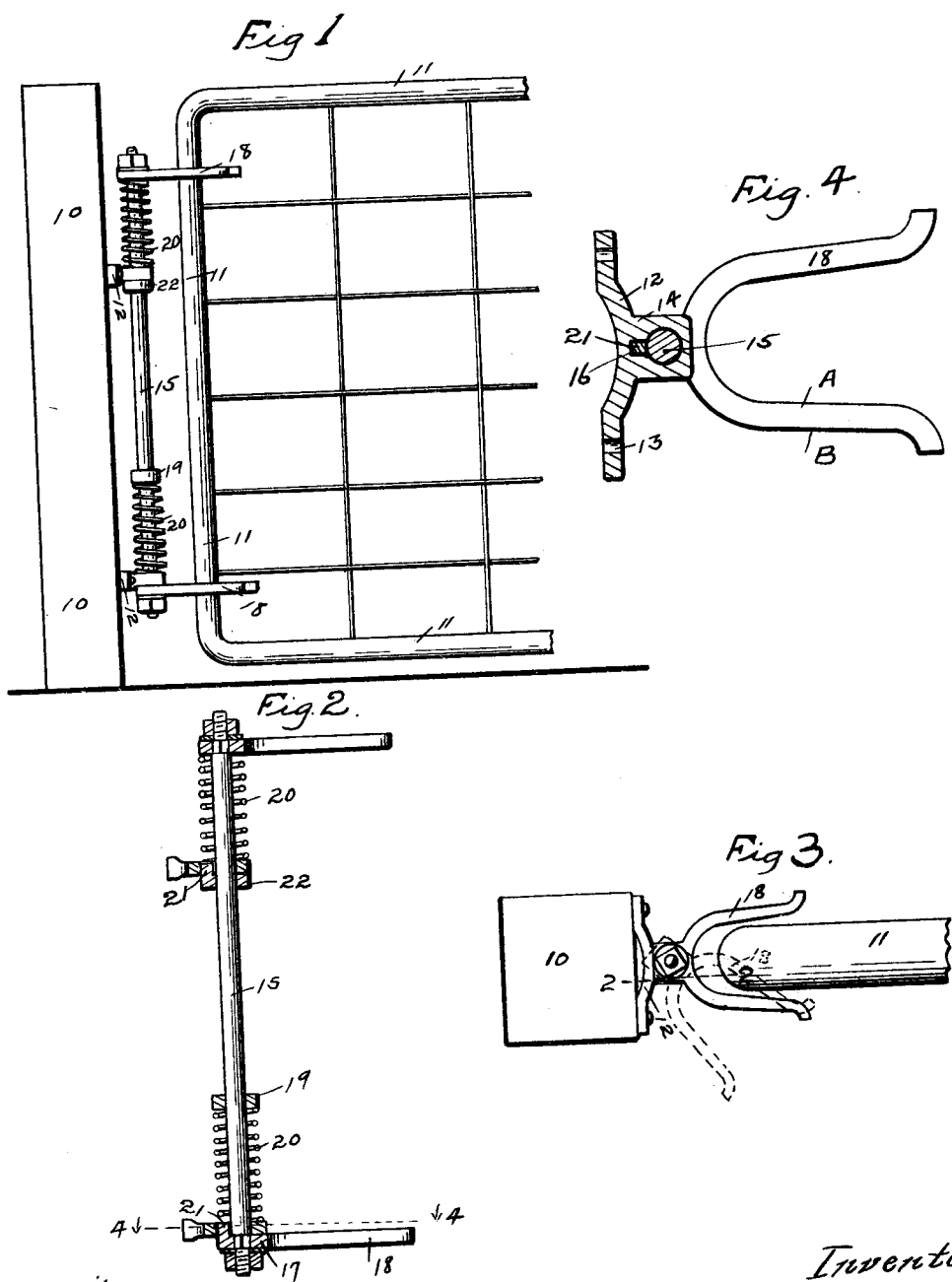
Witnesses
G. F. Turechek
Will Freeman
Inventor
Emmet J. Taylor
By Orwig + Bair
Att'ys.

UNITED STATES PATENT OFFICE.

EMMET J. TAYLOR, OF GUERNSEY, IOWA.

GATE-LATCH.

1,138,026. Specification of Letters Patent. Patented May 4, 1915.

Application filed July 6, 1914. Serial No. 849,225.

*To all whom it may concern:*

Be it known that I, EMMET J. TAYLOR, a citizen of the United States, and resident of Guernsey, in the county of Poweshiek and State of Iowa, have invented a certain new and useful Gate-Latch, of which the following is a specification.

The object of my invention is to provide a gate latch of simple, durable and inexpensive construction.

More particularly, it is my object to provide a gate latch which can be worked either with the foot or with the hand, so that for instance, if the hands are occupied, the gate can be readily and easily opened.

Still a further object is to provide such a latch, so constructed and arranged that when the gate is open, the latch stands in position to engage the gate when it is swung toward closed position and which will automatically lock when the gate is moved to its closed position.

My invention consists in certain details, in the construction, combination and arragement of the various parts of the device, whereby the objects contemplated are attained, as hereinafter more fully set forth, pointed out in my claims and illustrated in the accompanying drawing, in which:

Figure 1 shows a side elevation of a portion of the gate and a gate latch, embodying my invention. Fig. 2 shows a vertical, sectional view, taken on the line 2—2 of Fig. 3. Fig. 3 shows a top or plan view of the gate latch and a portion of the gate, and Fig. 4 shows a horizontal, sectional view, taken on the line 4—4 of Fig. 2.

In the accompanying drawings, I have used the reference numeral 10 to indicate generally the post at the free end of the swinging gate 11. My improved gate latch comprises a pair of brackets 12 secured to the post 10 by means of bolts or the like extended through openings 13 in the brackets. The brackets are provided with forwardly extending bearings 14, in which is rotatably mounted an upright rod 15. The brackets are mounted one above the other and spaced from each other, as shown in Fig. 1. The brackets are provided with notches 16 adjacent to the openings in the bearings 14, for the rod 15.

Fixed on the rod 15, just below the lower bracket 12, is a gate engaging device, comprising a body 17 fixed on the rod 15, having a pair of outwardly extending arms 18, which together have substantially the shape of a horizontal U. The free ends of the arms 18 are curved outwardly, as shown in Fig. 4. The arms 18 are formed thicker at their inner sides A than at their outer sides B. This makes it possible to secure greater strength for the purpose with a minimum of weight of material.

Fixed on the rod 15 above the lower bracket 12, and spaced therefrom, is a collar 19. Between the collar 19 and the bracket 12 is a coil spring 20. The body 17 is provided with an upwardly extending lug 21, designed in one position of the gate engaging device to be received in the notch 16 in the bracket, as clearly shown in Fig. 2. Fixed on the rod 15, just below the upper bracket 12, is a collar 22, having a similar lug 21, adapted in one position of the rod 15 to enter the notch 16 in the upper bracket 12. Fixed on the rod 15, above the upper bracket 12, and spaced therefrom, is a second gate engaging device, constructed like the one already described, with the exception that it does not have the lug 21. Between the upper bracket 12 and the upper gate engaging device, is a coil spring 20, similar to that already described.

In the practical use of my improved gate latch, when the gate is closed, the effect of the springs is to hold the rod 15 at the upper limit of its movement and to hold the lug 21 in the notches 16. When it is desired to open the gate, the foot may be placed upon one of the arms 18 of the lower gate engaging device, or if desired, the upper gate engaging device may be seized with the hand and the rod 15 moved downwardly against the pressure of the spring. When the rod 15 is moved downwardly a sufficient distance to permit the lugs 21 to clear the brackets, the gate may be pushed open, when the rod 15 will rotate in its bearings, carrying with it the gate engaging device to the position, for instance, shown by dotted lines in Fig. 3. The friction of the parts caused by the spring pressure is sufficient to hold the gate engaging devices in their open position ready to receive and engage the end of the gate between the arms 18 when the gate has moved toward its closed position.

In closing the gate, all that it is necessary to do is to swing the gate toward the post 10. The gate will enter the engaging devices and when it moves to fully closed position, the springs will raise the rod 15 and cause the lugs 21 to enter the notches 16. The gate is thus automatically locked without further attention.

Where my improved gate latch is used, it will readily be seen that the latch may be operated either with the hand or with the foot. A person having both hands engaged with a load or the like may depress the lower gate engaging device with the foot and push the gate open with his shoulder or the like, without touching any of the parts with his hand.

The parts are of comparatively simple and inexpensive construction and may be readily and easily applied to any post and used with any ordinary swinging gate.

It will be understood that some changes may be made in the details of the construction of my device without departing from its essential features, and it is my intent to cover any such changes which may be included within the scope of the following claims.

I claim as my invention:

1. In a device of the class described, a pair of brackets adapted to be secured to a post, said brackets being provided with vertically alined bearings, said brackets being provided also with notches adjacent to the openings of said bearings, a rod rotatably and slidably mounted in said bearings, a gate engaging device, comprising a body fixed on said rod, and arms extending away from said body in substantially U shaped form, a lug on said body shaped to engage the notch in one of said brackets, and yielding means for normally drawing said rod to position for causing said gate engaging means to engage one of said brackets.

2. In a device of the class described, a pair of brackets adapted to be secured to a post, said brackets being provided with vertically alined bearings, said brackets being provided also with notches adjacent to the openings of said bearings, a rod rotatably and slidably mounted in said bearings, a gate engaging device, comprising a body fixed on said rod, and arms extending away from said body in substantially U shaped form, a lug on said body shaped to engage the notch in one of said brackets, yielding means for normally drawing said rod to position for causing said gate engaging means to engage one of said brackets, a second gate engaging means similar to the first excepting that it locks the lug on said body, a collar adjacent to the other of said brackets, provided with the lug adapted to enter the notch in the second bracket, and yielding means for tending to hold said rod in position to cause said collar to engage said second bracket.

3. In a device of the class described, a pair of brackets adapted to be secured to a post, said brackets being provided with vertically alined bearings, said brackets being provided also with notches adjacent to the openings of said bearings, a rod rotatably and slidably mounted in said bearings, a gate engaging device, comprising a body fixed on said rod, and arms extending away from said body in substantially U shaped form, a lug on said body shaped to engage the notch in one of said brackets, yielding means for normally drawing said rod to position for causing said gate engaging means to engage one of said brackets, a second gate engaging means similar to the first excepting that it lacks the lug on said body, a collar adjacent to the other of said brackets, provided with a lug adapted to enter the notch in the second bracket, and yielding means for tending to hold said rod in position to cause said collar to engage said second bracket, said U shaped device having its arms thickened at their inner faces.

4. In a device of the class described, a pair of brackets adapted to be secured to a post, said brackets being provided with vertically alined bearings and with notches adjacent to said bearings, a rod slidably and rotatably mounted in said bearings, gate engaging devices fixed on said rod adjacent to one of said bearings, and provided with a lug adapted to be received in the notch in said bearing when the gate engaging device is in one position of its movement, and yielding means for holding said gate engaging device in engagement with said first bearing, a collar fixed on said rod adjacent to the second bracket, provided with a lug adapted to enter the notch in said second bearing when said rod is in one position of its movement, a second gate engaging device, comprising a body fixed on said rod, each of said gate engaging devices having arms in a substantial U shape, and means for yieldingly holding said rod in position for holding said collar in engagement with said second bracket.

EMMET J. TAYLOR.

Witnesses:
W. GLENN WARNOCK,
T. H. MINER.

Copies of this patent may be obtained for five cents each, by addressing the "Commissioner of Patents, Washington, D. C."